US012798684B2

(12) United States Patent
Park et al.

(10) Patent No.: US 12,798,684 B2
(45) Date of Patent: Nov. 17, 2026

(54) SEAT RAIL INTEGRATED BODY MEMBER ASSEMBLY

(71) Applicants: HYUNDAI MOTOR COMPANY, Seoul (KR); KIA CORPORATION, Seoul (KR)

(72) Inventors: Tae-Soo Park, Seoul (KR); Seong-Eun Choi, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 289 days.

(21) Appl. No.: 18/624,942

(22) Filed: Apr. 2, 2024

(65) Prior Publication Data

US 2025/0214656 A1 Jul. 3, 2025

(30) Foreign Application Priority Data

Dec. 28, 2023 (KR) ........................ 10-2023-0194670

(51) Int. Cl.

*B62D 25/20* (2006.01)
*B60N 2/015* (2006.01)
*B60N 2/06* (2006.01)
*B60R 11/00* (2006.01)
*B62D 65/02* (2006.01)

(52) U.S. Cl.

CPC ......... *B62D 25/2009* (2013.01); *B60N 2/015* (2013.01); *B60N 2/06* (2013.01); *B60R 2011/0007* (2013.01); *B62D 65/02* (2013.01)

(58) Field of Classification Search

CPC ................ B62D 25/2009; B62D 25/20; B62D 25/2036; B62D 21/03; B62D 21/08; B60R 2011/0007; B60N 2/015; B60N 2/06

USPC .......... 296/193.07, 187.08, 204, 24.34, 37.8, 296/65.13; 180/68.5

See application file for complete search history.

(56) References Cited

U.S. PATENT DOCUMENTS 8,833,839 B2 * 9/2014 Young .................. B62D 25/025 296/187.08
11,285,796 B2 3/2022 Choi
11,524,726 B2 12/2022 Fujisawa
(Continued)

FOREIGN PATENT DOCUMENTS

JP 3736459 B2 1/2006
JP 2008087650 A 4/2008
(Continued)

*Primary Examiner* — Roger L Pang
(74) *Attorney, Agent, or Firm* — Lempia Summerfield Katz LLC

(57) ABSTRACT

A body member assembly has an integrated seat rail and is coupled to a floor panel for a vehicle. The body member assembly includes a plurality of body longitudinal member coupled to the floor panel and disposed in a transverse direction of a vehicle body. The body member assembly also includes a plurality of seat cross members coupled to the floor panel and with end portions coupled to side end portions of neighboring body longitudinal members, respectively. Thus, it is possible to integrate overlapping functions, secure body rigidity, and reduce the number of parts and/or manufacturing or assembly processes by constituting the integrated body member and at the same time, integrating a seat rail with a vehicle body.

15 Claims, 10 Drawing Sheets

(56) References Cited

U.S. PATENT DOCUMENTS

| | | | | |
|---|---|---|---|---|
| 2007/0007054 | A1 * | 1/2007 | Nakashima | B60K 1/00 180/65.1 |
| 2013/0229030 | A1 * | 9/2013 | Yamaguchi | B62D 25/20 296/193.07 |
| 2020/0406734 | A1 | 12/2020 | Choi | |
| 2021/0107571 | A1 | 4/2021 | Fujisawa | |
| 2021/0387550 | A1 * | 12/2021 | Lee | B62D 25/2036 |
| 2021/0387672 | A1 * | 12/2021 | Choi | B60N 2/015 |
| 2022/0410973 | A1 * | 12/2022 | Kim | B62D 21/15 |

FOREIGN PATENT DOCUMENTS

| | | | |
|---|---|---|---|
| JP | 5487760 | B2 | 5/2014 |
| JP | 6928719 | B2 | 9/2021 |
| KR | 20210000993 | A | 1/2021 |

* cited by examiner

SEAT RAIL INTEGRATED BODY MEMBER ASSEMBLY

CROSS-REFERENCE TO RELATED APPLICATION

This application claims priority to Korean Patent Application No. 10-2023-0194670, filed on Dec. 28, 2023, which is incorporated herein by reference in its entirety.

BACKGROUND

Field of the Disclosure

The present disclosure relates to a body member assembly, and more specifically, to a body member assembly capable of serving as a seat rail at the same time.

Description of Related Art

FIG. 1 is a view illustrating a conventional body member assembly and FIG. 2 is a cross-sectional view taken along line X-X in FIG. 1.

A conventional body member assembly is configured to be bonded to a floor panel of a vehicle and to allow a seat rail and the like to be mounted thereabove while securing the rigidity of a vehicle body.

As illustrated in the drawings, the body member assembly is formed in a structure in which a pair of seat cross members 21 is bonded across a transverse direction of a floor panel 10. The seat cross members 21 and a plurality of body longitudinal members 22 are bonded. One end portion of each of the body longitudinal members 22 is bonded to the seat cross members 21.

Since the body member assembly is configured by coupling steel-based individual parts manufactured by a press or stamping method, the number of parts including body parts and seat parts to be described below is excessive.

Therefore, there is a limit in that it is difficult to simplify an assembly process due to the excessive number of parts, construct the layout of interior outfitting parts, and construct simple interior styling. In addition, there is a high possibility of joint and buzz, squeak, rattle (BSR) problems occurring due to excessive quality control costs for managing gaps/steps between connected parts and insufficient securing of gaps between parts due to manufacturing dispersion.

In addition, a structure of a conventional vehicle includes a seat rail disposed on the body longitudinal members 22 to overlap each other. This causes redundancy and an increase in weight.

In particular, since the body longitudinal member 22 has a disconnected structure as illustrated, there is a limit to coupling with the seat rail and with respect to structural rigidity.

Therefore, when it is necessary to improve side impact rigidity, there is no choice but to improve the side impact rigidity by collectively increasing the thickness of each of the seat cross members 21 or adding a reinforcement material or structure to the insides of the seat cross members 21.

Subject matter described above in the background section is intended to help in understanding the background of the disclosure. The background section may include subject matter not related to the related art already known to those of ordinary skill in the art to which this technology pertains.

SUMMARY

The present disclosure has been made in efforts to solve the above problems. The present disclosure is directed to providing an integrated seat rail and body member assembly, which may integrate overlapping functions, secure body rigidity, and reduce the number of parts or manufacturing or assembly processes. The present disclosure does so by constituting an integrated body member and at the same time, integrating a seat rail with the body member.

A body member assembly with an integrated seat rail is coupled to a floor panel for a vehicle according to one aspect of the present disclosure. The integrated body member assembly includes a plurality of body longitudinal members, which is coupled to the floor panel and disposed in a transverse direction of a vehicle body. The integrated body member assembly also includes a plurality of seat cross members, which are coupled to the floor panel with both end portions thereof coupled to side end portions of neighboring body longitudinal members, respectively.

In addition, the plurality of seat cross members may be disposed in a plurality of rows.

In addition, a seat upper rail coupled to a lower portion of a seat may be slidably mounted on one or more respective body longitudinal members.

Furthermore, the body longitudinal members may be formed to extend to positions corresponding to a first seat row and a second seat row of the vehicle.

In addition, the seat rail integrated body member assembly may further include a side reinforcing member coupled to a side surface of a most lateral body longitudinal member among the plurality of body longitudinal members.

Here, the body longitudinal member and the side reinforcing member may be bonded by metal inert gas (MIG) welding.

In addition, the body longitudinal members and the seat cross members may be bonded by MIG welding.

Meanwhile, the body longitudinal members and the floor panel, and the seat cross members and the floor panel, may be bonded by MIG welding, spot welding, self-piercing rivet (SPR), or any combination thereof.

Furthermore, ribs may be formed inside the body longitudinal members and the seat cross members.

In addition, the seat rail integrated body member may further include a console member with both end portions coupled to the seat cross member at a first row and the seat cross member at a second row, Respectively, and on which a console is mounted.

According to the present disclosure, by including body parts and seat parts, it is possible to considerably reduce the number of parts and save weight.

Nevertheless, by changing the disconnected structure of the longitudinal members into the improved continuous structure, the disclosed structure is more advantageous than the conventional structure in terms of securing static or dynamic rigidity.

Therefore, it is possible to reduce the number of manufacturing or assembly processes (it is not necessary to add a process for molding or bonding) for collision performance improvement tuning and expect the improvement in joint/buzz, squeak, rattle (BSR) improvement by deleting the connecting structure between the parts.

In addition, it is possible to delete separate rails for seat mounting.

In addition, it is possible to expand the forward and rearward sliding range of the seats and easily implement the lounge concept interior when the cell to vehicle (CTV) (body-battery integrated structure) is applied.

DESCRIPTION OF SPECIFIC EMBODIMENTS

For a full understanding of the present disclosure, operational advantages of the present disclosure, and objects to be achieved by practicing the present disclosure, reference should be made to the accompanying drawings, which illustrate embodiments of the present disclosure, and the contents described in the accompanying drawings.

In describing the embodiments of the present disclosure, a description of known techniques or repetitive descriptions that may have unnecessarily obscured the gist of the present disclosure have been reduced or omitted. When a component, device, element, or the like of the present disclosure is described as having a purpose or performing an operation, function, or the like, the component, device, or element should be considered herein as being “configured to” meet that purpose or perform that operation or function.

Figure 1:
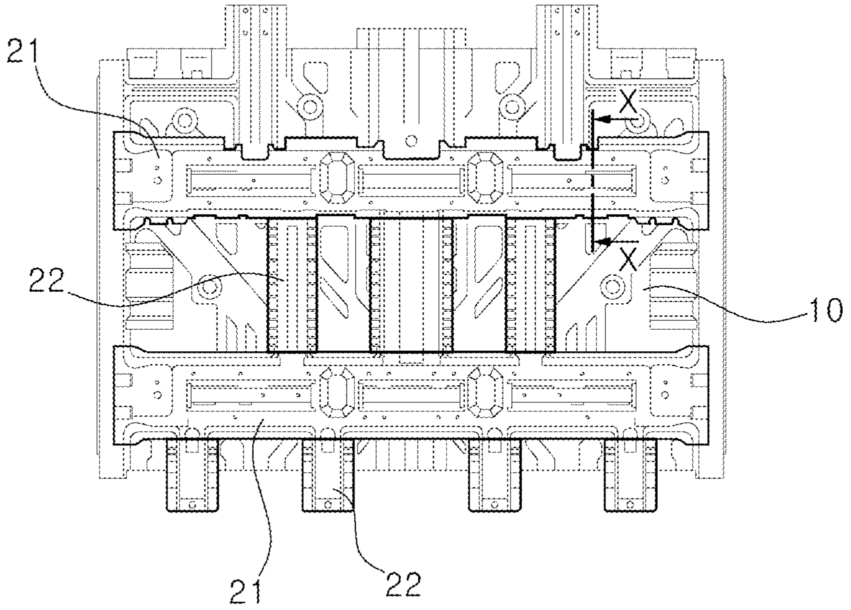
FIG. 1 (PRIOR ART)
FIG. 1 is a view illustrating a conventional body member assembly.
Figure 2:
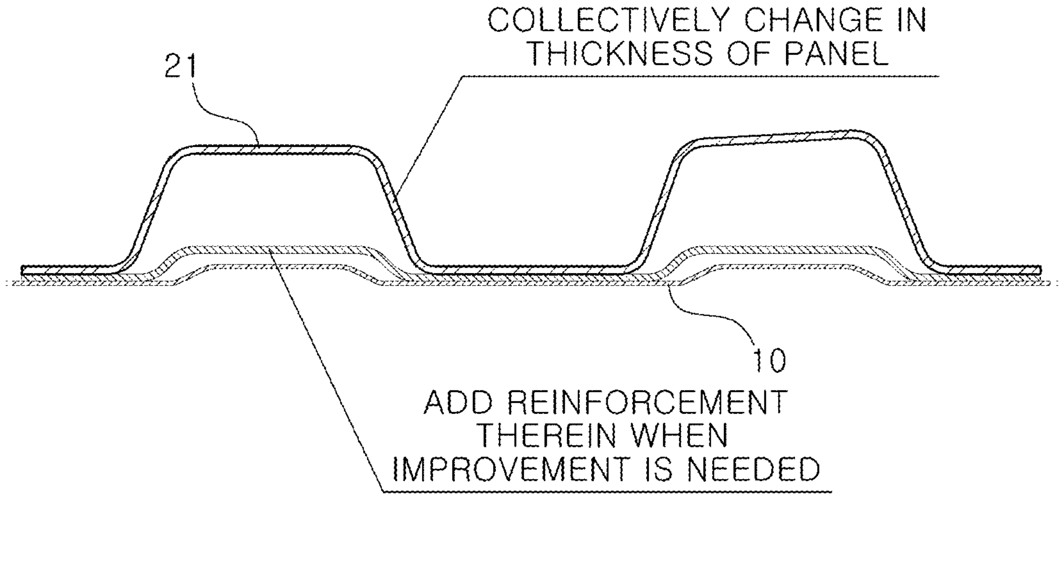
FIG. 2 (PRIOR ART)
FIG. 2 is a cross-sectional view taken along line X-X of the body member assembly in FIG. 1.
Figure 3:
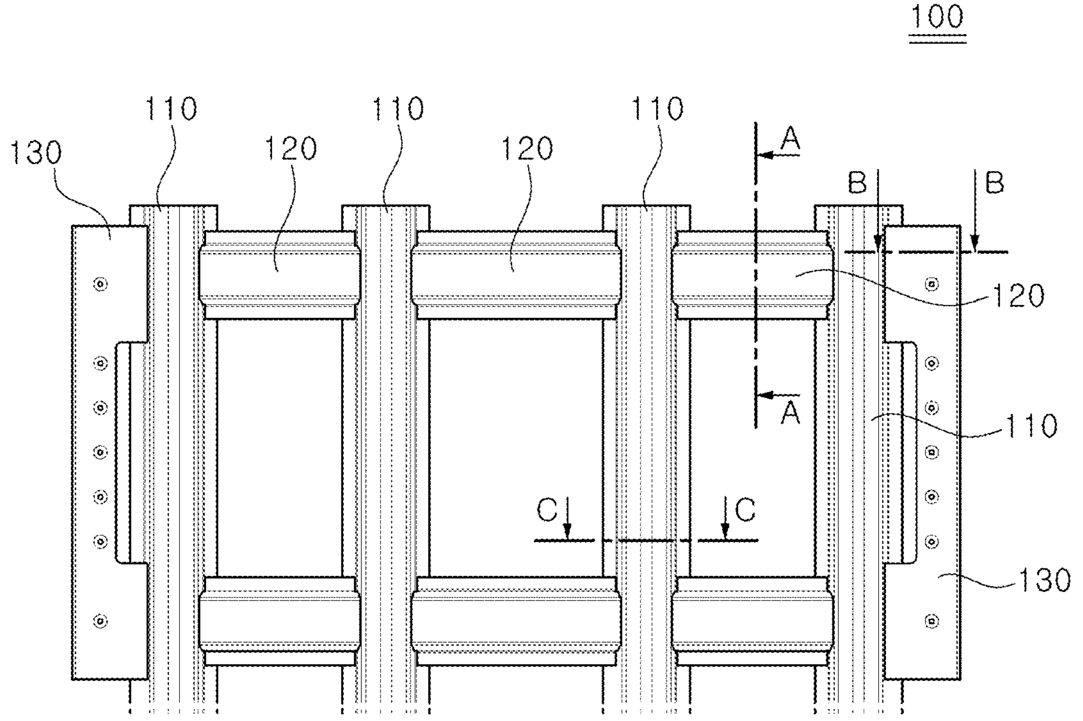
FIG. 3 is a view illustrating a body member assembly with an integrated seat rail according to the present disclosure.
Figure 4:
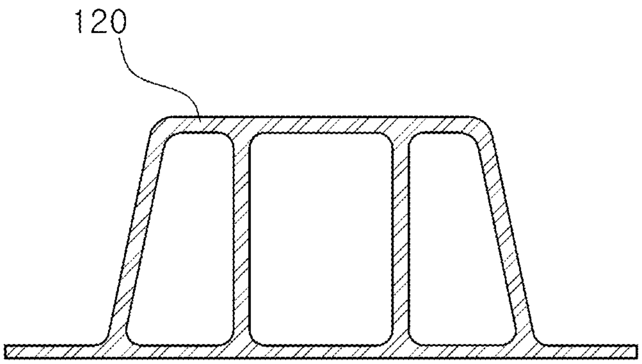
FIG. 4 is a cross-sectional view taken along line A-A of the body member assembly in FIG. 3.
Figure 5:
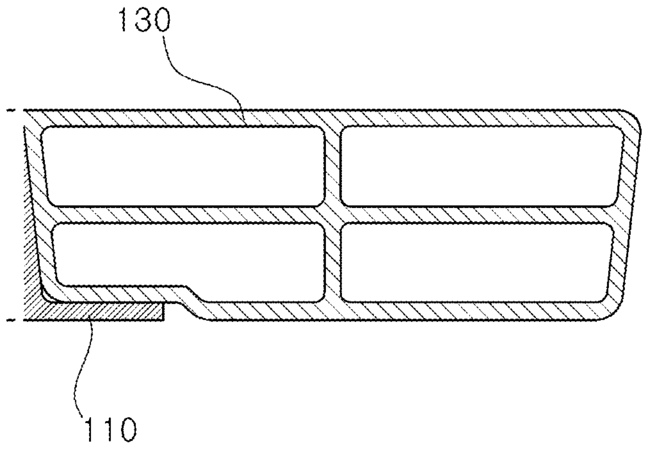
FIG. 5 is a cross-sectional taken view along line B-B of the body member assembly in FIG. 3.
Figure 6:
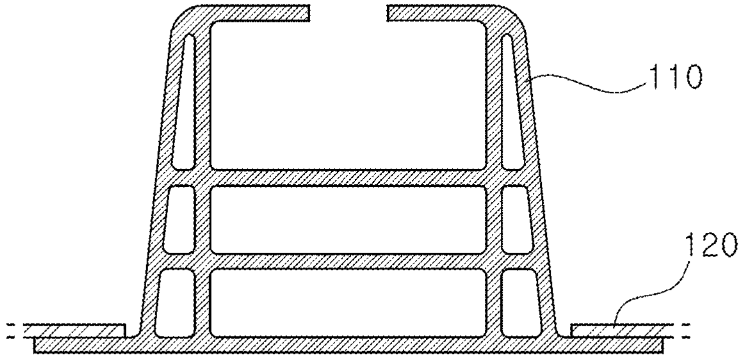
FIG. 6 is a cross-sectional view taken along line C-C of the body member assembly in FIG. 3.

FIG. 3 is a view illustrating a seat rail integrated body member assembly, i.e., a body member assembly 100 with an integrated seat rail, according to the present disclosure. In addition, FIG. 4 is a cross-sectional view taken along line A-A in FIG. 3, FIG. 5 is a cross-sectional view taken along line B-B in FIG. 3, and FIG. 6 is a cross-sectional view taken along line C-C in FIG. 3.

Hereinafter, the body member assembly 100 according to one embodiment of the present disclosure is described with reference to FIGS. 3-6.

The body member assembly 100 according to the present disclosure is an integrated member assembly bonded to a floor panel 10 for a vehicle and has a seat rail integrated with the body member assembly. The body member assembly 100 is capable of having greater rigidity than a conventional assembly, reducing the number of parts, and serving as a seat rail.

The body member assembly 100 includes a body longitudinal member 110 and a seat cross member 120.

The body longitudinal member 110 is bonded to the floor panel 10 in a longitudinal direction of a vehicle body. A plurality of the body longitudinal members 110 may be uniformly disposed and spaced apart in a transverse direction of the body, as depicted in FIG. 3.

The body longitudinal members 110 may be made of a 6000-series or a 7000-series aluminum material and may be formed in an aluminum extrusion method or the like. The seat cross members 120 and a side reinforcing member 130 at each side of the body may also be provided in the same manner.

In addition, a plurality of the seat cross members 120 may be bonded on the floor panel 10. Both end portions of the seat cross members 120 are respectively bonded to side end portions of neighboring, i.e., adjacent one’s of the, body longitudinal members 110. The opposed ends of the seat cross members 120 may be bonded to the corresponding or neighboring body longitudinal members 110 by metal inert gas (MIG) welding or the like.

In addition, the seat cross members 120 may be disposed in a plurality of rows as illustrated. Multiple seat cross members 120 may be arranged to define one row by being disposed between multiple body longitudinal members 110, and multiple rows of the seat cross members 120 may also be provided, as shown in FIG. 3.

Therefore, the body longitudinal members 110 form a continuous structure in a front-rear longitudinal direction of the body, which is more advantageous than the conventional longitudinal members with the disconnected structure in terms of securing static or dynamic rigidity.

In addition, each of the the body longitudinal members 110 is formed in the continuous structure in the front-rear longitudinal direction of the body. Since the body longitudinal members 110 may serve as a seat rail, specifically, a seat lower rail or support, a seat upper rail that is coupled to a seat is coupled to the body longitudinal member 110. Thus, the seat can slide along the body longitudinal member 110 in the front-rear or longitudinal direction of the vehicle body.

Furthermore, in the conventional design, since setting of the mounting points for separately assembling the seat rail is needed, a sliding loss space is inevitably formed. However, the body member assembly 100 according to the present disclosure can improve the conventional loss space by the seat rail integrated structure.

Therefore, a sliding range of the seat can be increased, and the body longitudinal members 110 can be formed from a first seat row to a second seat row.

In addition, in order to respond to irregular poles, the side reinforcing members 130, which may be formed in the aluminum extrusion method, are bonded to laterally exposed side surface portions of the most lateral body longitudinal members 110 among the plurality of body longitudinal members 110. The side reinforcing members 130 may be bonded using MIG welding or the like.

Figure 7:
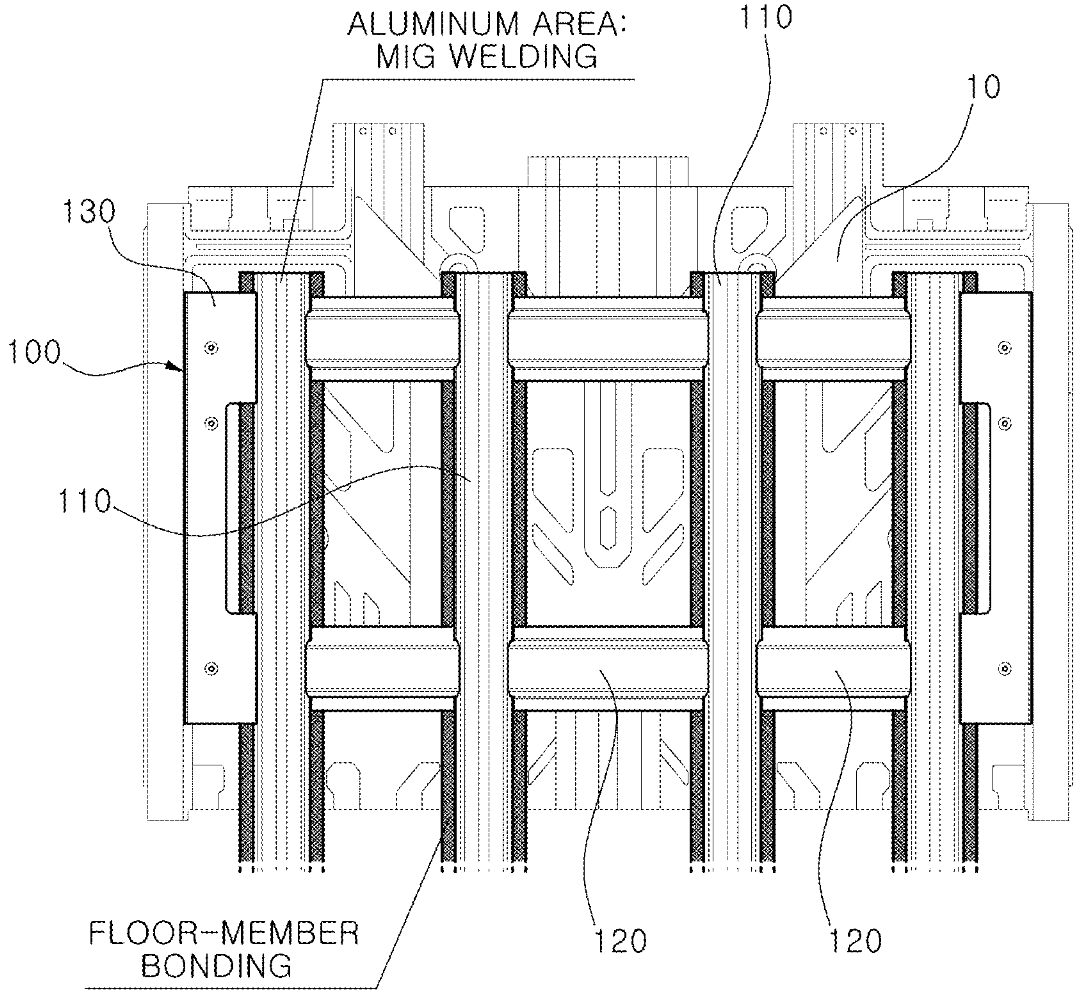
FIG. 7 is a view illustrating a bonded state of a body member assembly and integrated seat rail according to the present disclosure.
Figure 8:
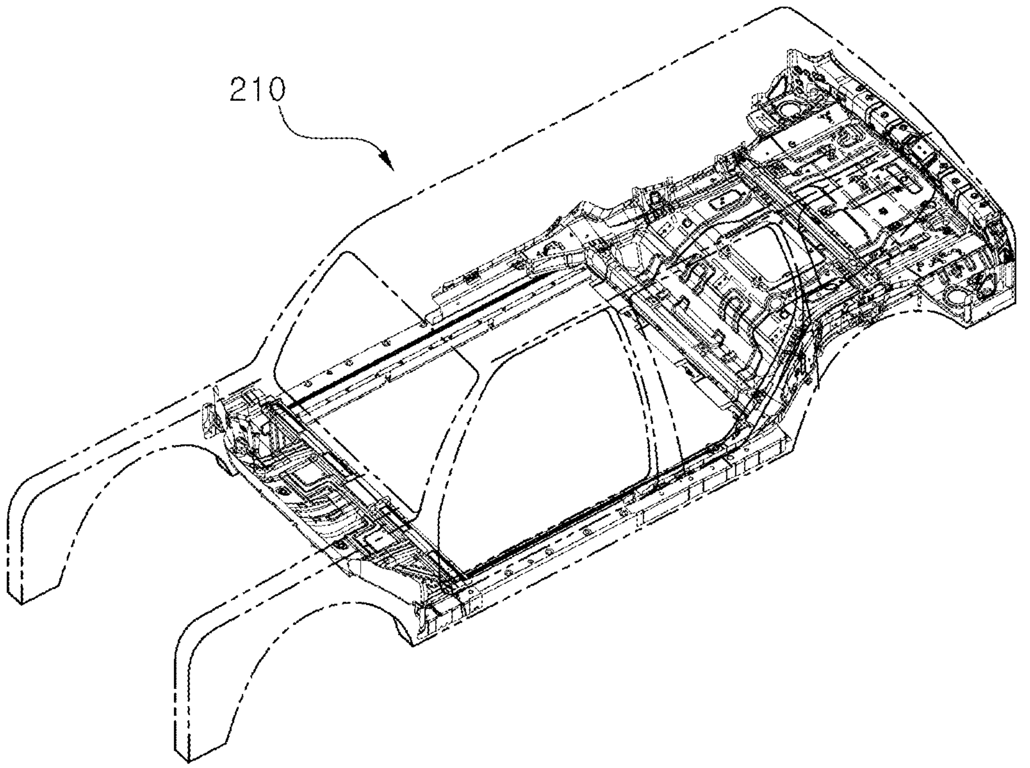
FIGS. 8-11 are views illustrating an embodiment in which the body member assembly and integrated seat rail according to the present disclosure is applied to a vehicle with a cell to vehicle (CTV) structure.
Figure 9:
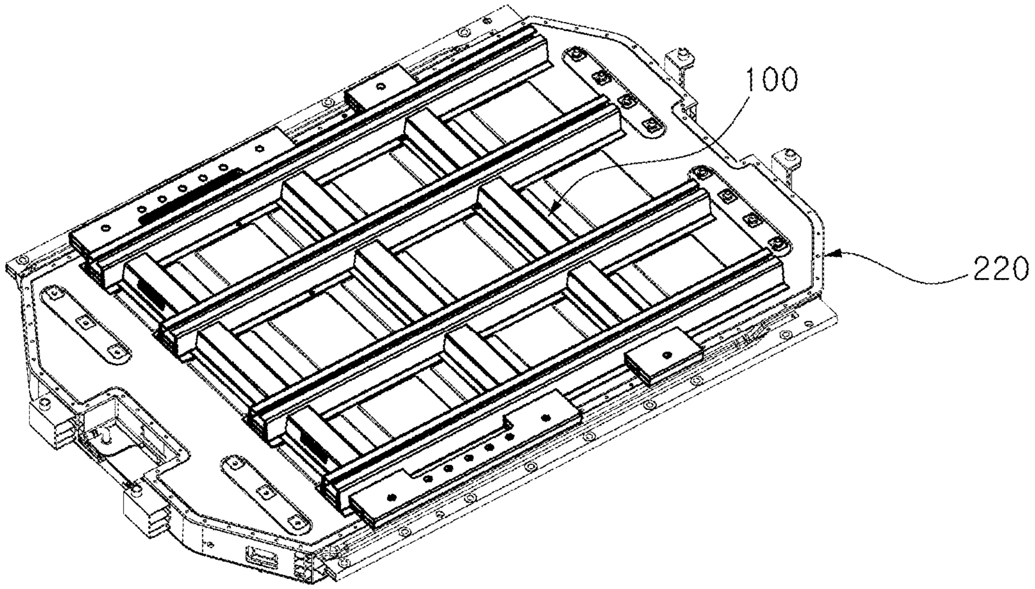
Figure 10:
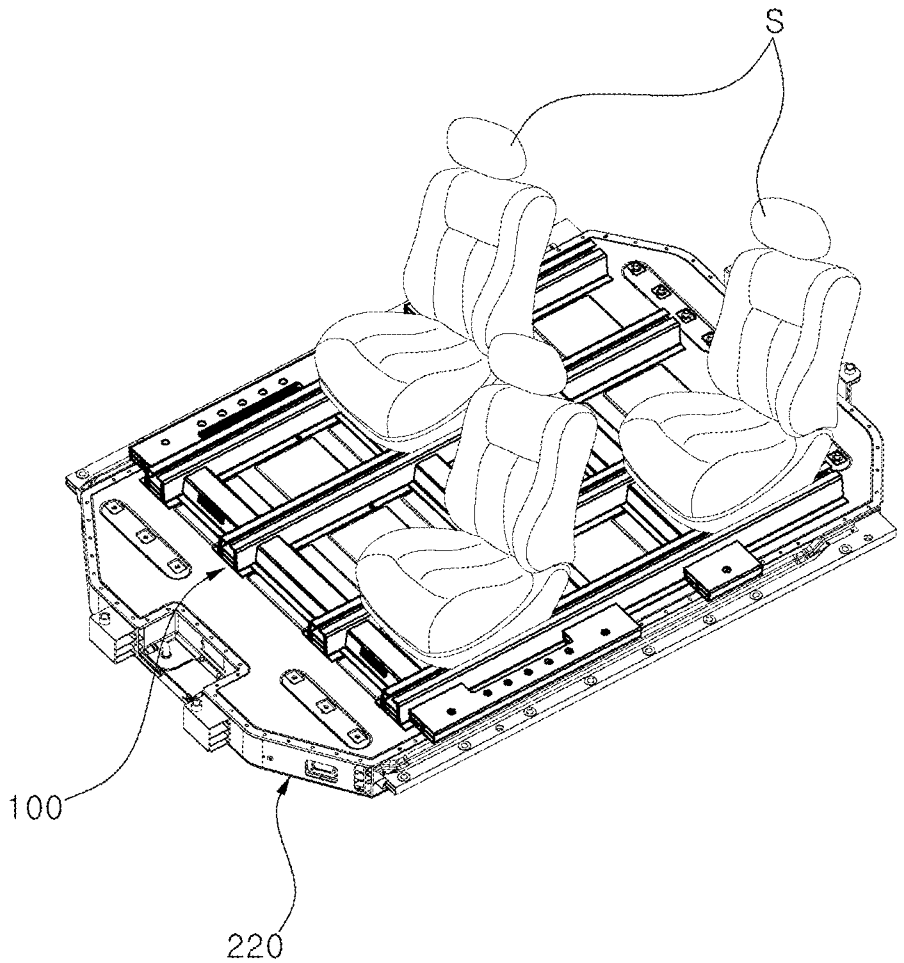
Figure 11:
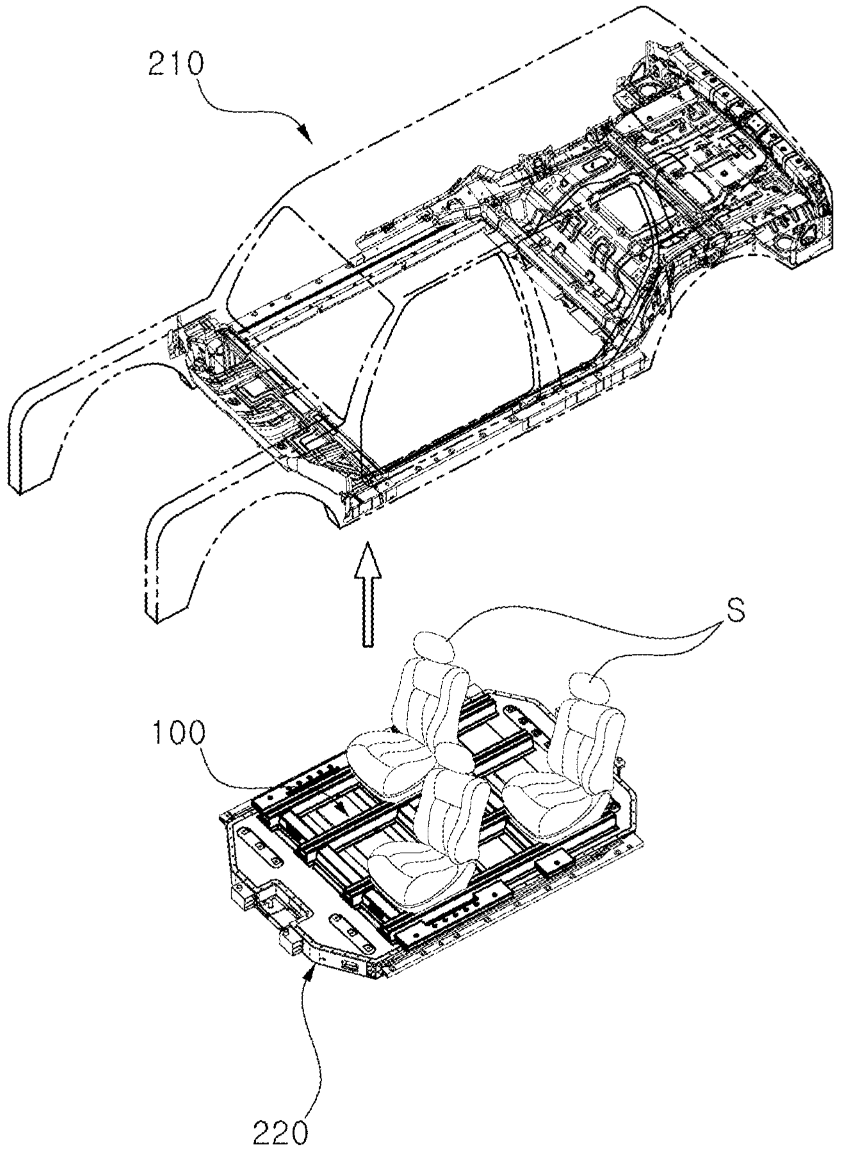

In other words, as illustrated in FIG. 7, an aluminum area may be bonded by MIG welding. Also, the body member assembly and the floor panel 10 may be bonded by MIG welding, aluminum spot welding, or SPR when the floor panel 10 is made of an aluminum material and bonded by self-piercing rivet (SPR) when the floor panel 10 is made of a steel material.

Furthermore, as illustrated in FIGS. 4-6, longitudinal or transverse ribs may be formed inside the body longitudinal members 110, the seat cross members 120, and the side reinforcing members 130 for enhancing structural rigidity. A section modulus (rigidity) may be adjusted by adjusting a thickness of an aluminum extrusion material and the thicknesses, arrangement, and number of ribs.

Therefore, in order to yield an improvement over the conventional side collision rigidity, there is no need for a process of collectively increasing the thickness of the member or adding the reinforcement to the inner side or inside of the members.

As described above, in the body member assembly structure according to the present disclosure, the body longitudinal members 110 may be formed as an integrated long sliding rail and configured to extend from a first seat row to a second seat row. It is difficult to apply the first/second row integrated long sliding rail for implementing a lounge seating concept to the conventional internal combustion engine (ICE) and electric vehicle (EV) structures due to problems in a structure of putting the long rail and the organization of the number of assembling processes caused by a B pillar upon in-line assembling.

This limit can be resolved by applying the disclosed body member assembly 100 to a vehicle with the CTV as illustrated in FIGS. 8-11 in the following method to freely move the seat to a first row or second row. An interior space may thereby be implemented as a space with the lounge concept.

In STEP 1, a body in white (BIW) 210, which does not yet include a floor, is assembled.

In STEP 2, the seat rail integrated body member assembly 100 according to the present disclosure, in which the body longitudinal member 110 serves as the first/second row long sliding rail, is pre-assembled to a battery case 220 in which a battery is embedded.

In STEP 3, a seat S is pre-mounted on the seat rail integrated body member assembly 100 by STEP 2.

In addition, in STEP 4, by assembling a battery system in which the BIW 210 and outfitting parts are pre-mounted to overcome the above limit, the interior space can be formed as the space with the lounge concept by the long sliding rail.

Figure 12:
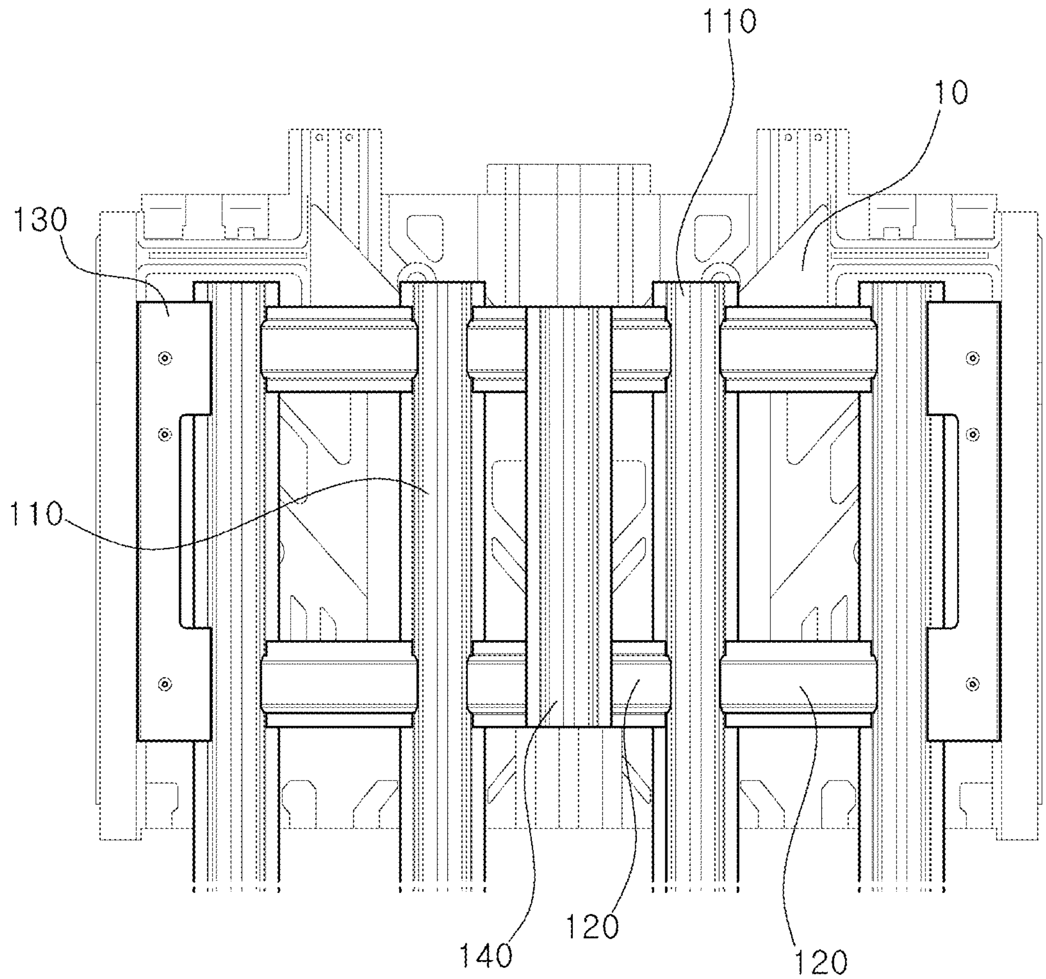
FIGS. 12 and 13 are views illustrating body member assemblies according to additional embodiments of the present disclosure.
Figure 13:
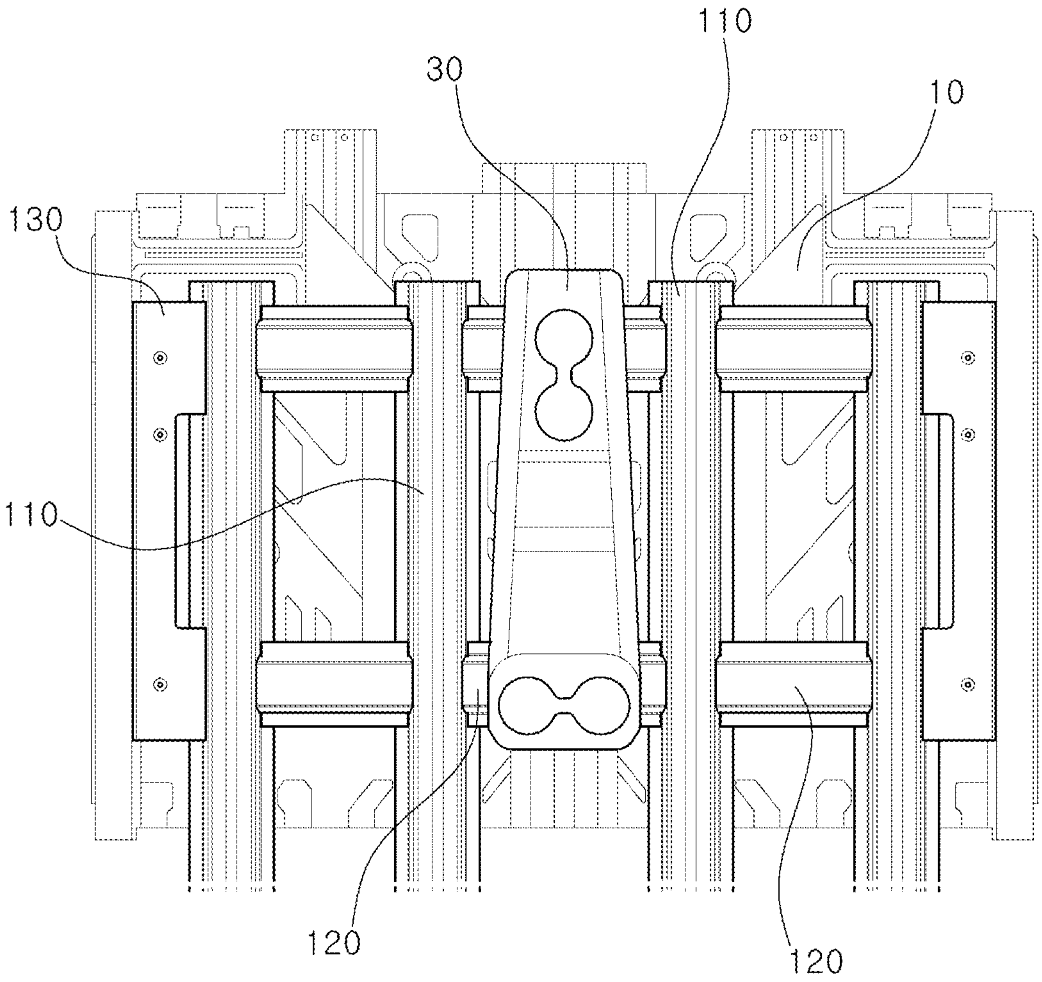

Next, FIGS. 12 and 13 are views illustrating additional embodiments of the present disclosure.

In one embodiment, the seat rail integrated body member assembly may further include a console member 140. Both end portions of the console member 140 are each bonded to the corresponding seat cross member 120 at the first row and the corresponding seat cross member 120 at the second row. A console 30 may be slidably mounted on the console member 140.

Although the present disclosure has been described above with reference to certain embodiments depicted in the drawings, the present disclosure is not limited to the described embodiments. It should be apparent to those of ordinary skill in the art that various modifications and changes can be made without departing from the spirit and scope of the present disclosure. Therefore, these modified examples or changed examples should be included in the claims of the present disclosure, and the scope of the present disclosure should be construed based on the appended claims.

What is claimed is:

1. A body member assembly with an integrated seat rail and coupled to a floor panel for a vehicle, the body member assembly comprising:

- a plurality of body longitudinal members, which is coupled to the floor panel and disposed in a transverse direction of a vehicle body;
- a plurality of seat cross members, which is coupled to the floor panel and wherein both end portions of each seat cross member of the plurality of seat cross members are coupled to side end portions of neighboring body longitudinal members, respectively;
- a longitudinal aperture located on top of at least one longitudinal member of the plurality of body longitudinal members, wherein a seat upper rail is coupled to a lower portion of a seat and is slidably mounted in the longitudinal aperture; and
- a plurality of horizontal ribs integrally formed in the at least one longitudinal member, wherein the longitudinal aperture is exposed to at least one of the plurality of horizontal ribs.

2. The body member assembly of claim 1, wherein the plurality of seat cross members are disposed in a plurality of rows.

3. The body member assembly of claim 1, wherein the plurality of body longitudinal members is configured to extend from a position corresponding to a first seat row of the vehicle to a position corresponding to a second seat row of the vehicle.

4. The body member assembly of claim 1, further comprising a side reinforcing member coupled to a side surface of a most lateral body longitudinal member among the plurality of body longitudinal members.

5. The body member assembly of claim 4, wherein the most lateral body longitudinal member and the side reinforcing member are bonded by metal inert gas (MIG) welding.

6. The body member assembly of claim 1, wherein the plurality of body longitudinal members and the plurality of seat cross members are bonded by MIG welding.

7. The body member assembly of claim 1, wherein the plurality of body longitudinal members and the floor panel, and the plurality of seat cross members and the floor panel, are bonded by any one of MIG welding, spot welding, self-piercing rivet (SPR), or any combination thereof.

8. The body member assembly of claim 1, wherein ribs are formed inside of each of the plurality of seat cross members.

9. The body member assembly of claim 2, further comprising a console member with both end portions thereof coupled to a seat cross member of the plurality of seat cross members at a first row and to another seat cross member of the plurality of seat cross embers at a second row, respectively, and on which a console is mounted.

10. A body member assembly with an integrated seat rail and coupled to a battery case for a vehicle with a cell to vehicle (CTV) structure, the body member assembly comprising:

- a plurality of body longitudinal members, which is coupled to the battery case and disposed in a transverse direction of a vehicle body;
- a plurality of seat cross members which is coupled to the battery case and with both end portions coupled to side end portions of neighboring body longitudinal members of the plurality of body longitudinal members, respectively;
- a longitudinal aperture located on top of at least one longitudinal member of the plurality of body longitudinal members, wherein a seat upper rail is coupled to a lower portion of a seat and is slidably mounted in the longitudinal aperture; and
- a plurality of horizontal ribs integrally formed in the at least one longitudinal member, wherein the longitudinal aperture is exposed to at least one of the plurality of horizontal ribs,
- wherein the at least one longitudinal member is configured to extend from a position corresponding to a first seat row of the vehicle to a position corresponding to a second seat row of the vehicle.

11. The body member assembly of claim 10, wherein the plurality of seat cross members is disposed in a plurality of rows.

12. The body member assembly of claim 10, further comprising a side reinforcing member coupled to a side surface of a most lateral body longitudinal member among the plurality of body longitudinal members.

13. The body member assembly of claim 12, wherein the most lateral body longitudinal member and the side reinforcing member are bonded by metal inert gas (MIG) welding.

14. The body member assembly of claim 10, wherein the plurality of body longitudinal members and the plurality of seat cross members are bonded by MIG welding.

15. The body member assembly of claim 10, wherein the plurality of body longitudinal members and the floor panel, and the plurality of seat cross members and the floor panel, are bonded by any one of MIG welding, spot welding, self-piercing rivet (SPR), or any combination thereof.

* * * * *